A. M. ROLAND.
VEHICLE LAMP.
APPLICATION FILED FEB. 18, 1914. RENEWED MAR. 1, 1915.
1,159,274.
Patented Nov. 2, 1915.
2 SHEETS—SHEET 2.
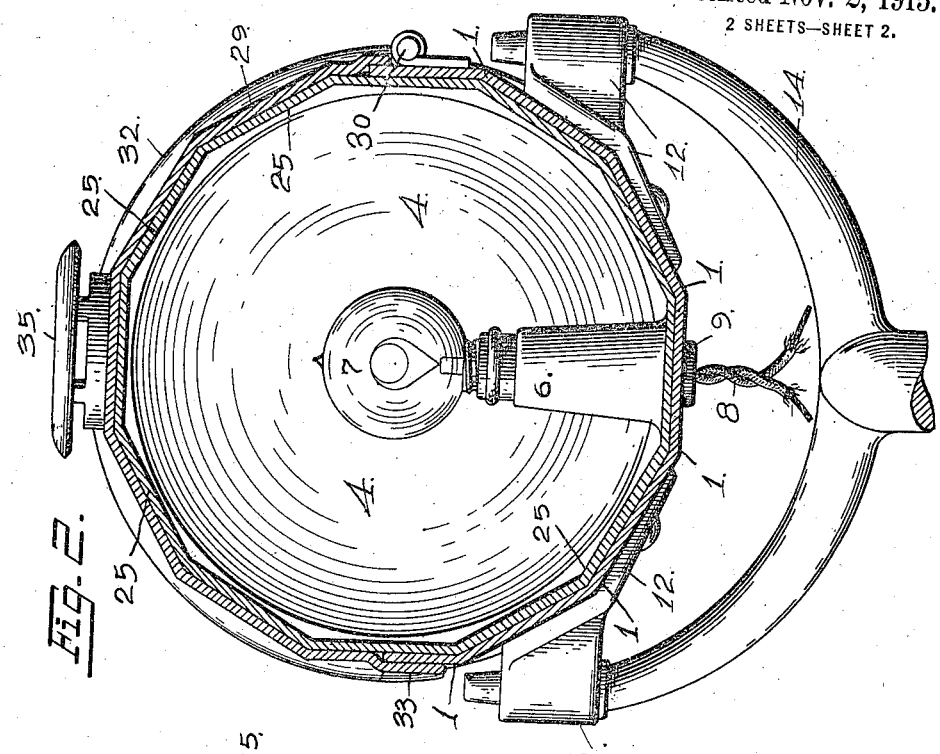
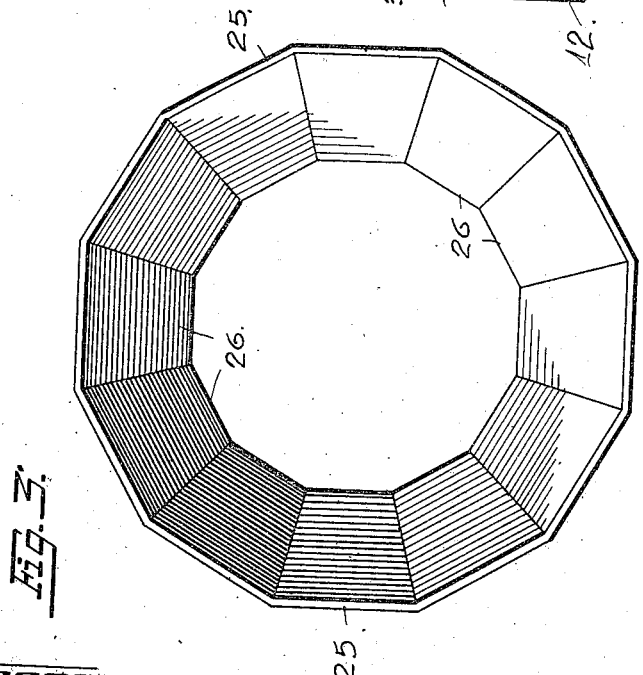
Witnesses
Inventor
Arthur M. Roland
BY Arthur L. Slee
HIS ATTY.

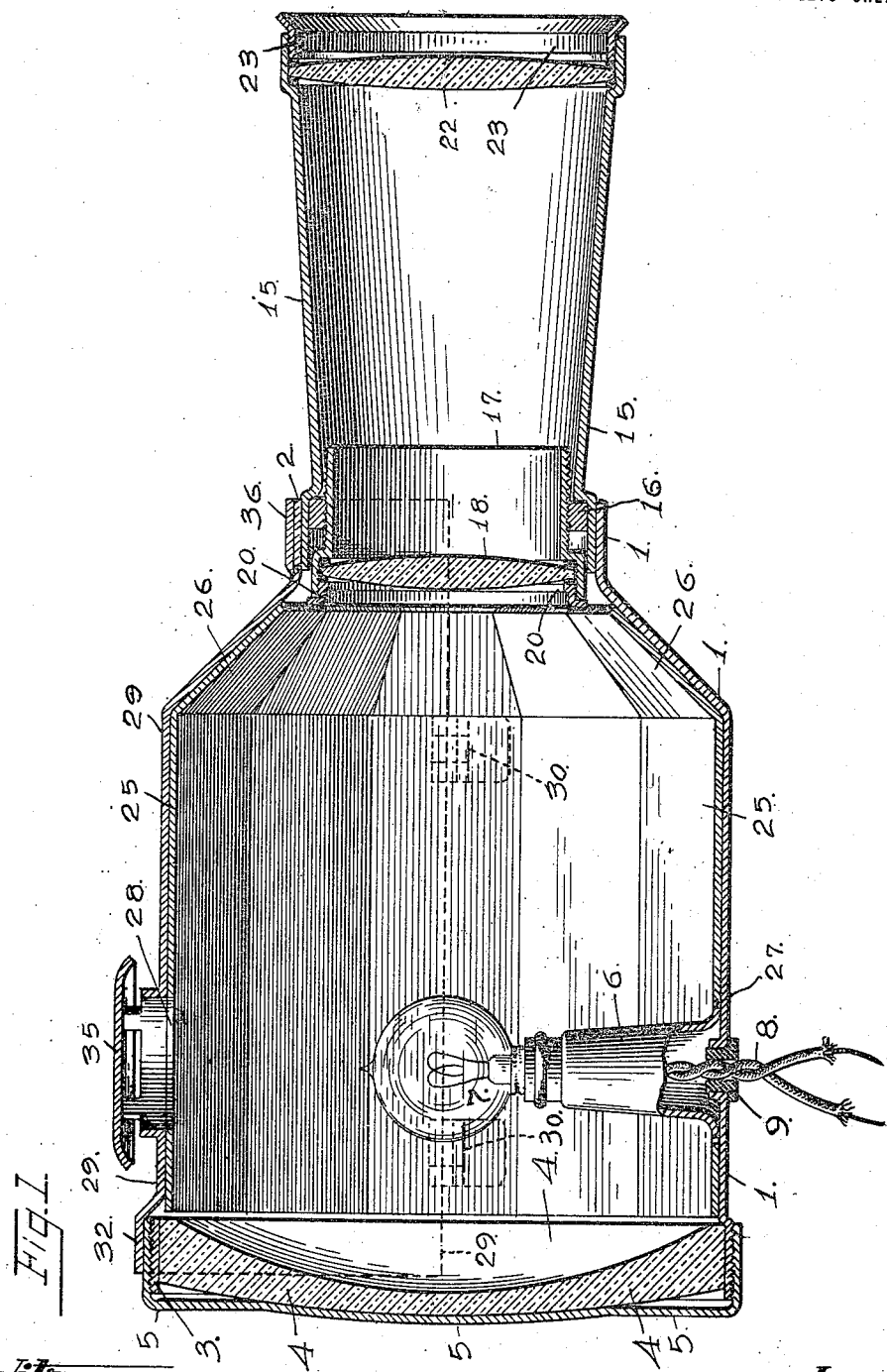
A. M. ROLAND.
VEHICLE LAMP.
APPLICATION FILED FEB. 18, 1914. RENEWED MAR. 1, 1915.
1,159,274.
Patented Nov. 2, 1915.
2 SHEETS—SHEET 1.
Witnesses
Inventor
Arthur M. Roland
BY Arthur L. Slee.
HIS ATTY.

UNITED STATES PATENT OFFICE.

ARTHUR M. ROLAND, OF SAN FRANCISCO, CALIFORNIA.

VEHICLE-LAMP.

1,159,274.     Specification of Letters Patent.     Patented Nov. 2, 1915.

Application filed February 18, 1914, Serial No. 820,770. Renewed March 1, 1915. Serial No. 11,324.

*To all whom it may concern:*

Be it known that I, ARTHUR M. ROLAND, a citizen of the United States, and residing in the city and county of San Francisco and State of California, have invented a new and useful Improvement in Vehicle-Lamps, of which the following is a specification.

My invention relates to lamps for automobiles and similar vehicles wherein a double lens, acting in conjunction with a suitable reflector, is used to focus the rays of the light for the purpose of eliminating the glare occasioned by the spreading of the light rays and the objects of my invention are first, to provide an improved vehicle lamp wherein the rays of light are focused; second, to provide a lamp wherein the focus may be adjusted; third, to provide an improved lamp of the character described whose interior may be accessible and at the same time properly protected from the rain and the like; and fourth, to provide a removable reflector which is adapted to reflect the lateral rays of light to the main reflector and from thence through the focusing lenses to the road ahead of the vehicle.

I accomplish these several features by means of the device disclosed in the drawings forming a part of the present specification, wherein like characters of reference are used to designate similar parts throughout the said specification and drawings and in which—

Figure 1 is a longitudinal sectional view of the lamp disclosing the main reflector, the lateral reflector, the double lenses, the means for adjusting one of the lenses and the lamp or light between the double lenses and the main reflector. Fig. 2 is a transverse sectional view taken through the body of the lamp, disclosing the manner in which the lateral reflector is retained within the body of the lamp by means of the cover. Fig. 3 is a view looking into the large end of the lateral reflector, the same having been removed from the body of the lamp.

In driving automobiles and similar vehicles where lamps are required, the glare from approaching vehicles prevents the driver from obtaining a proper view of the road ahead of him. Also the glare of the lamps on approaching vehicles is frequently detrimental to the eyesight and is apt to momentarily blind pedestrians, who may be attempting to cross the road in front of the approaching vehicle, to such an extent that they are unable to see vehicles coming from other directions, and thus render them liable to serious injury.

In order to eliminate this glare, I have provided the hereinafter described vehicle lamp which is arranged to focus the light on the road ahead of the vehicle to which it is attached and make traveling safer both for the drivers of approaching vehicles and pedestrians who may wish to cross the road.

Referring to the drawings, the numeral 1 is used to designate the lower half of a polyhedral body having front and rear rings 2 and 3 integral therewith. Within the rear ring 3 is secured the main concaved reflector 4 by means of the flanged disks 5 which may be screwed or otherwise secured to the said ring 3. Secured within the body 1 is a suitable socket 6 having an electric lamp 7 inserted therein. The wires 8 pass from the lamp 7 through a suitable insulating plug 9 within the lower portion of the body 1. The body is also provided on its under side with suitable apertured lugs 12 which are adapted to engage the forks of the usual lamp bracket 14.

A frusto-conical tube 15 has its smaller end slightly enlarged and inserted into the front ring 2 of the body 1. Within the said end is rigidly secured an internally threaded ring or collar 16 within which is in turn screwed the short tube 17. The tube 17 is also provided with an enlarged end within which is adjustably secured the smaller lens 18 by means of the threaded collar 20. In the same manner, the larger end of the frusto-conical tube is provided with a larger lens 22 secured therein by means of a second collar 23.

A hollow polyhedral reflector 25 is adapted to rest within the body 1 and is provided at one end with the converging sides 26. The reflector 25 is provided with a lower aperture 27 for the reception of the socket 6 and an upper aperture 28, the purpose of which will hereinafter be more fully described. A cover 29 is hinged as at 30 to the body 1 and is provided with an enlarged portion 32 which is arranged to lap over the end 5 and the longitudinal flange 33 which is adapted to lap over the opposite side of the body 1 for the purpose of preventing the entrance of rain or the like. The cover 29 is also provided with the vent 35 which is arranged to register with the aperture 28 in the upper portion of the polyhedral reflector 25. The front end of the cover 25 is also provided with the flange 36 at the front end thereof so as to properly overlap the front ring 2 of the body 1.

By means of the above arrangement the light rays of the lamp 7, which extend in all directions, are gathered or reflected by the sides of the polyhedral reflector 25 and the converging ends 26 thereof onto the main concaved reflector 4 from whence they are directed through the focusing lenses 18 and 22 and refracted into one straight beam of light which may be directed onto the road in advance of the vehicle to which the lamps are attached. By providing wires 8 of sufficient length, the lamp may be removed from the bracket 14 and carried around to inspect any part of the vehicle or to furnish light while making repairs.

I am aware that the present state of the art discloses lamps having double lenses therein for the purpose of focusing the light rays. Therefore I do not wish to claim as my invention such a combination broadly, but What I do claim and desire to secure by Letters Patent is—

1. The combination, in a vehicle lamp, of a lower half of a polyhedral body having a complete ring integral with each end thereof; a suitable lamp within the body; a frusto-conical tube secured within the front ring; a lens secured within each end of the frusto-conical tube; a polyhedral reflector within the body and having converging sides on the front end thereof; a half polyhedral cover secured to the polyhedral body and adapted to secure the polyhedral reflector therein; and a concave reflector secured within the body and polyhedral reflector and arranged to reflect the rays from the lamp from the polyhedral reflector and through the lenses in the frusto-conical tube.

2. The combination, in a vehicle lamp, of a lower half of a polyhedral body having a ring on each end and integral therewith; a suitable lamp within the body; a frusto-conical tube secured within the front ring; a lens rigidly secured to the front end of the said tube; a second lens adjustably secured within the rear end of the said tube; a polyhedral reflector having converging ends within the body; a suitable cover hinged to the body and adapted to secure the polyhedral reflector within the said body; means for adjusting the second mentioned lens; and a concaved reflector secured within the ring secured to the rear end of the body and arranged to reflect the rays of light from the lamp and from the sides of the polyhedral reflector through the lenses.

3. The combination, in a vehicle lamp, of a lower half of a polyhedral body having a ring on each end thereof and integral therewith; a suitable lamp within the body; a frusto-conical tube within the front ring of the body; a lens rigidly secured to the front end of the frusto-conical tube; a second lens adjustably secured within the rear end of the said tube; a polyhedral reflector having converging ends within the body; a cover hinged to the body and arranged to form the upper half of the said body and having flanges arranged to cover the front and rear rings and the opposite side of the body; and a concaved reflector secured within the rear ring on the body and arranged to reflect the light from the lamp and the polyhedral body and through the lenses in the frusto-conical tube.

4. A vehicle lamp comprising a half lamp body having complete rings at each end thereof, a lamp within the body, a frusto-conical lens tube connected to the front ring, a lens within each end of said tube, means to adjust one of said lenses, an oppositely placed half lamp body forming a cover for the lamp, a plurality of flat reflectors, a concave reflector, and a series of converging reflectors within the lamp body.

5. A vehicle lamp comprising a half lamp body having a ring at each end thereof, a lamp within the body, a lens tube connected to the front ring, a concave reflector secured to the back ring, a lens within each end of the lens tube, an oppositely placed half lamp body forming a cover for the lamp, and a series of flat reflectors secured to the inside of the lower portion and the cover portion of the lamp body respectively.

6. A vehicle lamp comprising a half lamp body having rings at each end thereof, a lamp within the body, a lens tube connected to the front ring, a lens within each end of said tube, means to adjust one of said lenses, a concave reflector secured to the rear ring of the lamp body, an oppositely placed half lamp body forming a cover for the lamp, and a plurality of flat reflectors, some of which converge toward the lens tube within said lamp body.

In witness whereof I hereunto set my signature in the presence of two subscribing witnesses.

ARTHUR M. ROLAND.

Witnesses:
JAMES S. McCUE,
KARL F. SCHULTZ.